(12) United States Patent
Christiansen et al.

(10) Patent No.: US 6,430,903 B1
(45) Date of Patent: Aug. 13, 2002

(54) NONMETALLIC DEBRIS DETECTOR FOR HARVESTER EQUIPMENT

(76) Inventors: Neil Christiansen, Box 2, Site 8 RR2, Ponoka, Alberta (CA), T4J 1R2; Dean Scrivens, Box 1, Site 20 RR1, Ponoka, Alberta (CA), T4S 1R1

(*) Notice: Subject to any disclaimer, the term of this patent is extended or adjusted under 35 U.S.C. 154(b) by 0 days.

(21) Appl. No.: 09/616,494

(22) Filed: Jul. 14, 2000

(51) Int. Cl.[7] .............................. A01D 75/28
(52) U.S. Cl. ..................... 56/10.2 J; 460/2
(58) Field of Search .............. 56/10.2 J, 10.2 R, 56/DIG. 15, DIG. 24; 460/2, 3; 367/99

(56) References Cited

U.S. PATENT DOCUMENTS

| | | | | |
|---|---|---|---|---|
| 3,959,953 A | * | 6/1976 | Garrott | 56/10.2 |
| 4,322,933 A | * | 4/1982 | Seymour | 56/10.2 |
| 4,335,563 A | * | 6/1982 | Rice et al. | 56/10.2 |
| 4,335,565 A | * | 6/1982 | Knepper et al. | 56/10.2 |
| 4,353,199 A | * | 10/1982 | Chow et al. | 56/10.2 |
| 4,720,963 A | * | 1/1988 | Weiss et al. | 56/10.2 J |
| 4,733,355 A | * | 3/1988 | Davidson et al. | 56/10.2 R |
| 4,768,525 A | * | 9/1988 | Tanis | 56/10.2 R |
| 4,883,964 A | * | 11/1989 | Bohman | 56/10.2 R |
| 5,042,015 A | * | 8/1991 | Stringer | 367/99 |
| 5,063,729 A | * | 11/1991 | Fox et al. | 56/10.2 R |
| 5,070,682 A | * | 12/1991 | Bohman | 56/10.2 J |

FOREIGN PATENT DOCUMENTS

| | | | | |
|---|---|---|---|---|
| DE | 2852126 | * | 6/1979 | 56/10.2 J |
| SU | 1308242 | * | 5/1987 | 56/10.2 J |

* cited by examiner

*Primary Examiner*—Robert E. Pezzuto
*Assistant Examiner*—Árpád Fábián Kovács

(57) ABSTRACT

An apparatus for detecting nonmetallic debris in plant material collected with harvester equipment. As the plant material is collected, a signal generator transmits a signal capable of distinguishing the nonmetallic debris from the plant material, and a sensor receives the generator signal and produces an alarm signal when the nonmetallic debris is detected. A controller receives the alarm signal and modifies operation of the harvester in response to the alarm signal. Different signals can identify the nonmetallic debris. The signal generator and sensor can function based on energy from laser light waves, from sound waves, microwave, gamma, x-ray, or fluoroscope energy wavelengths.

18 Claims, 2 Drawing Sheets

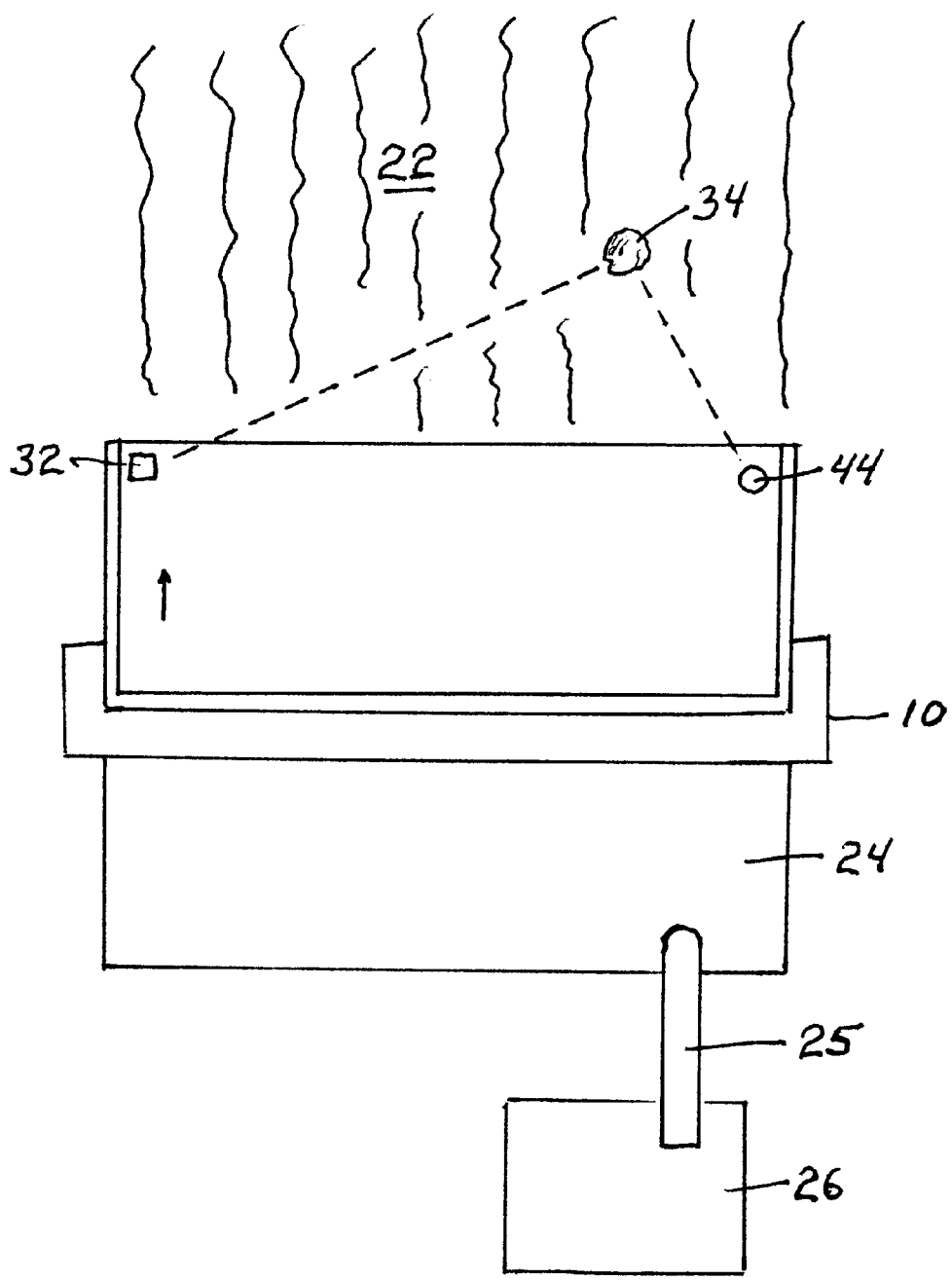

NONMETALLIC DEBRIS DETECTOR FOR HARVESTER EQUIPMENT

BACKGROUND OF THE INVENTION

The present invention relates to the field of agricultural equipment for harvesting crops. More particularly, the invention relates to a detector for sensing rocks and other dense objects which could damage cutter knives and other internal equipment components.

Many different types of farm equipment harvest crops and other plant materials for human and animal consumption. Grain combines for wheat, corn, soybeans, milo and other crops separate the grains from the stalks. Hay bines and silage cutters collect the plant stalks for animal feed. Other agricultural equipment includes disc bines, swathers, and other devices for collecting crops and plant materials.

Wire, metal trash, and rocks are commonly found in cultivated fields. Metal trash enters the fields from adjacent roads, hydrocarbon producing wells, and other trash sources. When such foreign objects enter the harvesting equipment, the objects frequently damage internal components such as teeth, cutter knives, and other crop handling equipment. Although grain harvesters such as combines typically receive the foliage intake above the ground elevation, harvesters such as silage cutters gather foliage near the ground elevation and are particularly susceptible to the entry of foreign materials. Silage cutters chop the plant material into small lengths which are collected and stored in a dirt pit or silo. Fermentation of the plant material prevents decay and converts the plant material into a silage material easily digested by livestock during winter months.

When a rock contacts the cutter knives in a silage cutter, the knives shatter or end, requiring replacement of the damaged knives. This damage is costly because of the equipment cost, labor to replace the knives, and lost production time. Lost production time is particularly important for custom harvesters operating twenty four hours per day during brief harvest periods.

Harvester equipment requires careful design because of the multiple field variables in collecting crops and other plant materials. If a screen or filter is placed to guard against undesirable debris, the plant material can collect against the screen or filter and ultimately clog the equipment. The structure and composition of undesirable debris also varies from rocks, to irregularly shaped tree branches, to man-made refuse. These variables complicate any system which seeks to maximize plant material collection.

Harvester equipment typically incorporate pressure equipment which prevents oversupply of plant material into the feed rolls. The pressure equipment routinely adjusts the feed roll pressure in response to variations in the plant material intake. As the harvester moves through a field or turns at the end of a pass, normal variations in the plant material density and in the equipment cutting swath changes the plant material quantity entering the feed rolls. When too much plant material enters the feed rolls and threatens to clog the equipment, a load detector reverses the feed rolls. Equipment operation can continue at a rate consistent with the load capabilities of the equipment.

Modern harvesters also incorporate metal detectors for sensing the intrusion of metal objects into the feed, drive rolls. The metal detectors typically use a magnetic field which is interrupted by the passage of metal. Such passage triggers an alarm and automatically pulls the drive rolls out of gear to prevent further movement of the metal toward delicate cutter knives. Typically, the metal is removed from the feed rolls by reversing the drive rolls.

U.S. Pat. No. 4,496,105 to Fleming et al. (1985) disclosed a forage harverter drive and electric control having an overload sensitive switch. In U.S. Pat. No. 5,070,682 to Bohman (1991), a microphone detected the presence of hard objects on a feed mechanism. When a hard object was detected, such object was already located within the feed mechanism and was in position to damage equipment. U.S. Pat. No. 4,768,525 to Tanis (1988) disclosed a sensing mechanism which detected the noise made by a stone after the stone entered the machine and was in contact with the components. Both of this concepts used noise detecting devices to distinguish the sound made by stones in contact with the machinery.

Except for these noise detection devices, most harvester equipment does not detect the presence of nonmetallic foreign objects in the plant material. Nonmetallic foreign objects are not detected by the metal detectors and may be sufficiently small to pass with the plant material through the initial feed rolls. Because of the frequency of rocks in certain cultivated fields, operators typically raise the intake elevation to reduce rock intake into the harvester equipment. This reduces the cutting efficiency of the equipment because more of the plant material is left unharvested. The problems of harvesting certain fields is particularly difficult for custom harvest crews which migrate from one geographic area to another with the change in harvest season. Because such crews are not knowledgable regarding the conditions of each field, and because such crews economically depend upon continuous operation, nonmetallic debris creates a special threat to custom cutting operations.

There is, accordingly, a need for an apparatus capable of detecting nonmetallic debris before such debris contacts internal harvester components. Such apparatus must be portable and should be adaptable to conventional harvester equipment.

SUMMARY OF THE INVENTION

The present invention provides an apparatus for detecting nonmetallic debris in plant material gathered by a harvester. The apparatus comprises a housing attachable to the harvester, a signal generator engaged with the housing for transmitting a signal capable of distinguishing the nonmetallic debris from the plant material, a sensor for receiving the generator signal and for producing an alarm signal when nonmetallic debris in the plant material is distinguished, and a controller for receiving the alarm signal and for modifying operation of the harvester in response to the alarm signal.

Different signals can identify the nonmetallic debris. The signal generator and sensor can function based on energy from laser light waves, from sound waves, microwave, gamma, x-ray, fluoroscope, or other energy forms.

The invention also discloses a plant material harvester for detecting nonmetallic debris in the plant material. The harvester comprises harvester equipment which is mobile relative to the plant material, plant material collecting equipment attached to the harvester equipment for gathering the plant material, a signal generator engaged with the harvester equipment for transmitting an energy wave signal capable of distinguishing the nonmetallic debris from the plant material, a sensor for receiving the generator signal and for producing an alarm signal when the energy wave signal distinguishes nonmetallic debris in the plant material, and a controller engaged with the harvester equipment for receiving the alarm signal and for modifying operation of the harvester equipment in response to the alarm signal.

BRIEF DESCRIPTION OF THE DRAWINGS

FIG. 4 illustrates a signal generator and sensor capable of detecting nonmetallic debris remote of a harvester.

DESCRIPTION OF THE PREFERRED EMBODIMENTS

Figure 1:
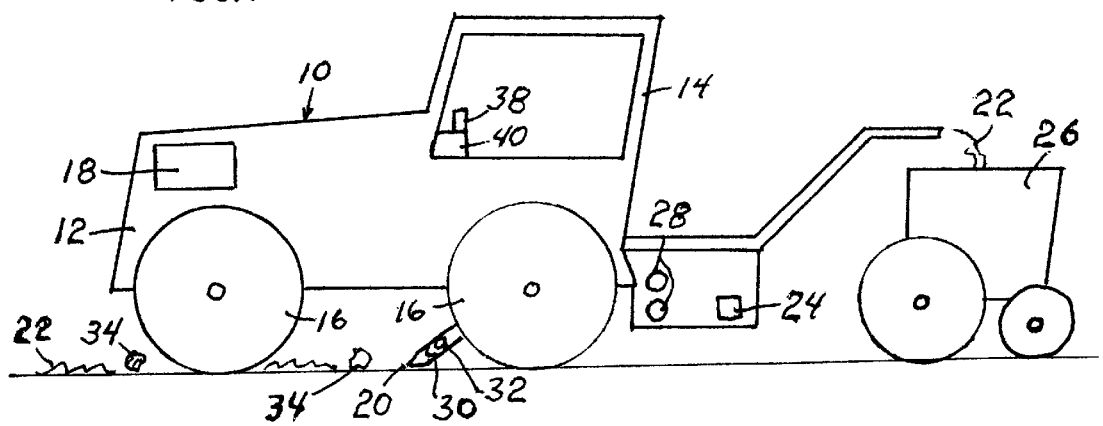
FIG. 1 illustrates a sensor adjacent to a signal generator.

The present invention discloses an apparatus and method for detecting nonmetallic debris in plant material collected by a harvester. For illustration purposes, FIG. 1 illustrates the operation of the invention with plant material collecting equipment such as silage cutter 10. Cutter 10 includes frame 12 supporting operating cab 14, wheels 16, and engine 18. Intake 20 collects plant material 22, cutter knives 24 chops plant material 22 into silage, and the silage material is discharged through chute 25 for collection by a hopper 26. Intake rollers 28 compact plant material 22 before plant material 22 contacts cutter knives 24.

Housing 30 is attached to harvester frame 12 and supports signal generator 32. Signal generator 32 transmits or generates a signal capable of distinguishing plant material 22 from nonmetallic debris 34 entrained within plant material 22. Nonmetallic debris 34 can comprise rocks, tree branches, plastic waste, and other material having a density greater than plant material 22. Sensor 36 receives the generator signal and produces an alarm signal when nonmetallic debris 22 is detected and distinguished. Such alarm signal from sensor 36 is transmitted to display 38 on controller 40. Controller 40 is capable of receiving the alarm signal and of modifying operation of silage cutter 10 in 5 response to such alarm signal. The modified operation can take many forms, including stoppage or reversal of intake rollers 28, cessation of cutter knives 24, immobilization of harvester frame 12, or other operating control steps or sequences.

As shown in FIG. 1, sensor 36 is positioned adjacent to signal generator 32. In this embodiment of the invention, a portion of the signal transmitted by signal generator 32 is reflected by either plant material 22 or nonmetallic debris 34 for detection by sensor 36. If nonmetallic debris 34 is capable of reflecting a portion of the signal, sensor 36 detects the presence of the nonmetallic debris 34 by the reflected signal. If plant material 22 is more reflective of the signal than nonmetallic debris 34, sensor 36 will detect nonmetallic debris 34 by the absence or diminution of the reflected signal.

Figure 2:
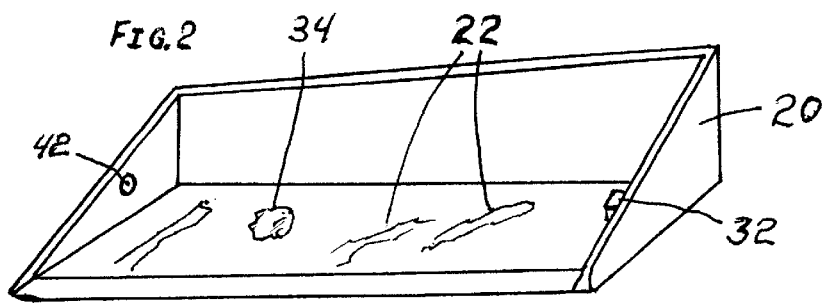
FIG. 2 illustrates a sensor placed opposite the signal generator.

FIG. 2 illustrates another embodiment of the invention wherein sensor 42 is placed opposite of signal generator 32 so that sensor 42 detects the presence or absence of a signal transmitted through plant material 22. The signal from signal generator 32 passes through plant material 22 and is detected by sensor 42. If nonmetallic debris 34 is more dense than plant material 22, nonmetallic debris 34 will be detected as a "hole" or "gap" in the transmitted signal. Sensor 42 can transmit the detected signal to controller 40 for signal processing and for identification on display 38.

The signals transmitted by signal generator 32 can modify the frequency, wavelength, intensity, or other variables to provide different information for detection by the relevant sensor. Such signals can be constant, can be pulsed, or can be otherwise modified to provide additional signal information.

Figure 3:
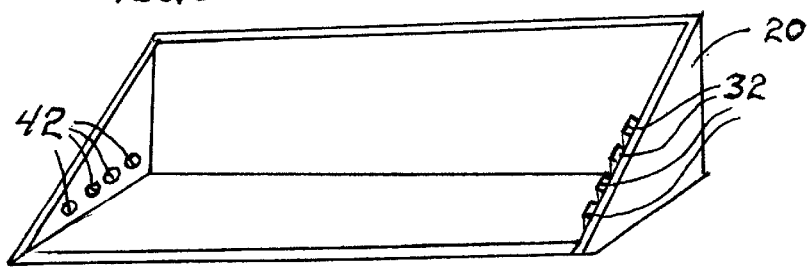
FIG. 3 illustrates multiple signal generators and sensors.

FIG. 3 illustrates another embodiment of the invention wherein multiple signal generators 32 are combined with multiple sensors 42 to provide information regarding a selected volume or cross-section through plant material 22. Signal generators 32 can operate at the same wavelength or frequency, or can operate at different wavelengths or frequencies. Multiple signal generators 32 and sensors 42 can provide additional information regarding the size and configuration and location of nonmetallic debris 34, and this information can be processed by a microprocessor or other electronic processor as controller 40.

FIG. 4 illustrates another embodiment of the invention wherein signal generator 32 and one or more sensors 44 detect nonmetallic debris 34 at a position distant from silage cutter 10. Signal generator 32 can comprise ground detection radar capable of identifying dense or reflective objects on top of the ground surface, or partially or completely buried below the ground surface. In this embodiment of the invention, the location of nonmetallic debris 34 can be identified before nonmetallic debris 34 enters intake 20. This feature of the invention permits operation of silage cutter 10 to raise or lower intake 20 without ceasing or otherwise modifying the collection of plant material 22. This capability saves the operator time by eliminating the need to cease operations so that nonmetallic debris 34 can be removed from plant material 22 after plant material 22 has been cut or collected. Although signal generator 32 and sensor 44 identifies nonmetallic debris 34 in the path of a moving silage cutter 10, signal generator 32 and sensor 44 could also identify nonmetallic debris 34 in adjacent swaths to the side of silage cutter 10 for recording and signal processing on controller 40.

The signal generated by signal generators 32 should be selected based on the particular plant material 22 and anticipated nonmetallic debris 34. Many forms of energy are suitable for distinguishing nonmetallic debris 34 from plant material 22 due to differences in density or light reflective capabilities of nonmetallic debris 34 and plant material 22. Representative examples of signal generator energy can include laser light waves, sound waves such as acoustic or ultrasonic wave energy, radio waves, radar signals, microwaves, gamma waves, x-rays, and fluoroscope x-ray energy. The frequency of energy provided by signal generator 32 can be visible or invisible, or can be a combination of each. Different frequencies, wavelengths, amplitudes, or power levels can be sequenced, pulsed, or transmitted simultaneously to provide different signal information regarding plant material 22 and nonmetallic debris 34. Although the invention is particularly suited for nonmetallic debris 34 as described above, the invention will also simultaneously detect the presence of metallic debris due to the density or reflective characteristics of nonmetallic or metallic debris within plant material 22.

Controller 40 can include an alarm for audible alerts to an operator regarding the presence of nonmetallic debris 34. If the signal generated by controller 40 identifies the location of nonmetallic debris 34 on display 38, an operator may more quickly identify such location for removal of nonmetallic debris 34 from plant material 22. Display of the repeated entry of nonmetallic debris 34 can also provide operating information to an operator, such as whether intake 20 should be raised, lowered, or otherwise reconfigured to limit the entry of nonmetallic debris 34.

Silage cutter 10 can provide cutting equipment for severing plant material 22 from the roots, or can collect previously severed plant material 22 left to dry in the fields. Although the operation of a silage cutter is illustrated, the invention is applicable to any type of equipment used in the collection of plant material for consumption or use in any manner. The principles of the invention are applicable to grain crops, silage, hay, fiber materials such as wood pulp, hops, hemp, and other leafy or fibrous plant materials. The invention provides an apparatus for adaption to conventional equipment, and provides a system having mobile harvester equipment, plant material collecting equipment attached to the harvester equipment, and one or more signal generators, sensors, and controller as previously discussed.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. An apparatus for detecting nonmetallic debris in plant material gathered by a harvester, comprising:
    a housing attachable to the harvester;
    a signal generator engaged with said harvester for transmitting a signal toward the plant material capable of distinguishing the nonmetallic debris from the plant material before the nonmetallic debris contacts the harvester,
    a sensor for receiving the generator signal and for producing an alarm signal, before the nonmetallic debris contacts the harvester, when the nonmetallic debris in the plant material is distinguished; and
    a controller for receiving said alarm signal and for modifying operation of the harvester in response to said alarm signal.

2. An apparatus as recited in claim 1, wherein said signal generator and sensor function based on laser light wave energy.

3. An apparatus as recited in claim 1, wherein said signal generator and sensor function based on sound wave energy.

4. An apparatus as recited in claim 3, wherein said signal generator and sensor function based on ultrasonic sound wave energy.

5. An apparatus as recited in claim 3, wherein said signal generator and sensor function on radio wave energy.

6. An apparatus as recited in claim 1, wherein said signal generator and sensor function on microwave energy.

7. An apparatus as recited in claim 1, wherein said signal generator and sensor function on gamma energy.

8. An apparatus as recited in claim 1, wherein said signal generator and sensor function on x-ray energy.

9. An apparatus as recited in claim 8, wherein said signal generator and sensor function on fluoroscope x-ray energy.

10. An apparatus as recited in claim 1, wherein said signal generator and sensor function on a combination of energy waves in the visible and invisible frequency ranges.

11. An apparatus as recited in claim 1, wherein said alarm signal identifies the location of the nonmetallic material relative to the harvester, and further comprising a display engaged with said controller for displaying an image representing the nonmetallic material location.

12. An apparatus as recited in claim 1, wherein said controller includes an electronic circuit for receiving said alarm signal and for generating a control signal for modifying operation of the harvester and for generating a indicator signal representing the presence of the nonmetallic material within the plant material.

13. An apparatus as recited in claim 1, wherein said signal generator and said sensor are positioned adjacent to the other, and wherein said sensor detects a signal generated by said signal generator and reflected from the nonmetallic debris.

14. A plant material harvester for detecting nonmetallic debris in the plant material, comprising:
    harvester equipment which is mobile relative to the plant material;
    plant material collecting equipment attached to said harvester equipment for gathering th[0085] plant material;
    a signal generator engaged with said harvester equipment for transmitting an energy wave signal capable of distinguishing the nonmetallic debris from the plant material before the nonmetallic debris contacts the harvester;
    a sensor for receiving said generator signal and for producing and alarm signal, before the nonmetallic debris contacts the harvester, when said energy wave signal distinguishes nonmetallic debris in the plant material; and
    a controller engaged with said harvester equipment for receiving said alarm signal and for modifying operation of the harvester equipment in response to said alarm signal.

15. A harvester as recited in claim 14, further comprising a display engaged with said controller, and wherein said controller is capable of sending a message signal to said display indicating the location of such nonmetallic debris.

16. A harvester as recited in claim 15 wherein said controller is capable of sending a message indicating the shape of such nonmetallic debris.

17. A harvester as recited in claim 15 wherein said controller is capable of sending a message indicating the shape of such nonmetallic debris.

18. A harvester as recited in claim 14, further comprising an audible alarm engaged with said controller for indicating the presence of nonmetallic debris in the plant material.

* * * * *